(12) United States Patent
Yuan (10) Patent No.: US 9,167,624 B2
(45) Date of Patent: Oct. 20, 2015

(54) METHOD AND OPERATION FOR OPERATION BETWEEN WPAN AND WLAN FOR A NETWORK INTERFACE CARD

(71) Applicant: Intel Corporation, Santa Clara, CA (US)

(72) Inventor: Hao Yuan, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/334,062

(22) Filed: Jul. 17, 2014

(65) Prior Publication Data

US 2014/0376522 A1    Dec. 25, 2014

Related U.S. Application Data

(63) Continuation of application No. 12/580,519, filed on Oct. 16, 2009, now Pat. No. 8,837,353.

(51) Int. Cl.
*H04W 92/02* (2009.01)
*H04W 72/12* (2009.01)
*H04W 88/06* (2009.01)
*H04W 88/10* (2009.01)
*H04W 36/00* (2009.01)

(52) U.S. Cl.
CPC .......... *H04W 92/02* (2013.01); *H04W 72/1215* (2013.01); *H04W 88/06* (2013.01); *H04W 88/10* (2013.01); *H04W 36/0027* (2013.01)

(58) Field of Classification Search
None
See application file for complete search history.

(56) References Cited

U.S. PATENT DOCUMENTS

2007/0238482 A1 * 10/2007 Rayzman et al. .......... 455/552.1

* cited by examiner

*Primary Examiner* — Jackie Zuniga Abad
(74) *Attorney, Agent, or Firm* — Schwegman Lundberg & Woessner, P.A.

(57) ABSTRACT

A wireless network adapter may provide an absence indicator to devices in a first network to alert such devices to a time period when the wireless network adapter is not available in the first network. The wireless network adapter may operate in multiple networks, wherein the multiple networks are time division multiplexed on a same transmission channel. The absence indicator may be provided as a Notice Of Absence (NOA) Information Element (IE).

15 Claims, 8 Drawing Sheets

METHOD AND OPERATION FOR OPERATION BETWEEN WPAN AND WLAN FOR A NETWORK INTERFACE CARD

PRIORITY APPLICATION

This application is a continuation of U.S. application Ser. No. 12/580,519, filed Oct. 16, 2009, now issued as U.S. Pat. No. 8,837,353, which is incorporated herein by reference in its entirety.

TECHNICAL FIELD

Some embodiments pertain to wireless communications and specifically to wireless network adapter functions.

BACKGROUND

Wireless capability extends to a variety of devices to operate in a multiple networks. An individual device may have a different role to perform in the various networks. A wireless network adapter may support any of a variety of protocols and procedures to support multiple networks.

DETAILED DESCRIPTION

The following description and drawings sufficiently illustrate specific embodiments to enable those skilled in the art to practice embodiments. Other embodiments may incorporate structural, logical, electrical, process, and other changes. Examples merely typify possible variations. Portions and features of some embodiments may be included in, or substituted for, those of other embodiments. Embodiments set forth in the claims encompass all available equivalents of those claims.

Methods and arrangements for wireless communications including a device for a wireless network adapter. In some embodiments a wireless network adapter enables a device to operate as multiple elements in multiple wireless networks. In one example, a device participates in communications in a WPAN as an AP, and participates in a communications in a WLAN as a STA. When operating as an AP, the device does not participate in communications as an STA. The device applies a NOA message to identify the time during which the device is operating as an AP.

Figure 1:
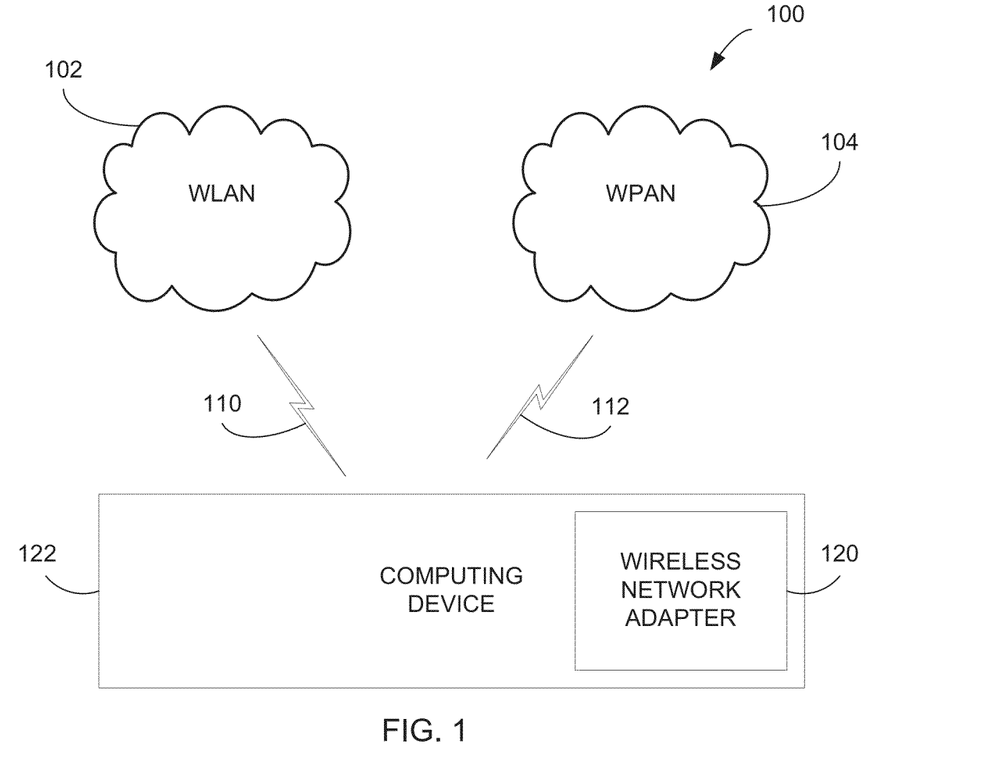
FIG. 1 illustrates a wireless communication system, in accordance with example embodiments.

FIG. 1 illustrates a wireless communication system 100 including a WPAN 104 and a WLAN 102. A computing device 122 within the wireless communication system 100 includes a wireless network adapter 120, wherein the computing device 122 communicates with the WLAN 102 via a communication path 110 and communicates with the WPAN 104 via a communication path 112. In some embodiments the wireless network adapter 120 is a coupled to the computing device 122 and is a removable module. The WLAN 102 is links multiple computers and devices using a wireless communication protocol, such as a spread-spectrum over-the-air protocol, which is adapted for communications in a local or limited area. The WLAN 102 provides coverage for mobile users, such as laptop computer users, while maintaining connectivity to the WLAN. The computing device 122 is adapted to participate in communications within the WLAN 102, and may operate as an STA in the WLAN 102.

The computing device 122 may also participate in communications within the WPAN 104, wherein the computing device operates as an AP. An AP in a wireless network may be referred to as a Wireless AP (WAP) to allow connectivity within the WPAN 104, wherein an AP relays data between wireless devices and possibly with wired devices coupled to a device within WPAN 104. The WPAN is a network to communicate among computer devices within a personal network. The read of the WPAN 104 is small compared to the WLAN 102. The WPAN 104 may be used for communication among personal devices or for connecting to other networks, such as to the Internet. In addition to the wireless communications, the WPAN 104 may further include wired connections, such as using a computer bus.

In some embodiments the WPAN 104 is enabled for synchronization to allow a user to initiate a quick connection to the network and transfer of information, wherein seamless bi-directional transfers are enabled on connection to the network. The WPAN 104 supports a variety of functions including file transfers by exploring a shared file system of connected device and transferring files or directories among the various devices of the WPAN 104, sharing a printer on the network, sharing display of information among devices, and communicating with devices, such as chat sessions, gaming, and social network functions. The WPAN 104 may further bridge communications between the WPAN 104 and the WLAN 102, and act as a portal to other networks. The WPAN 102 may further support streaming of data, such as audio, video and Voice over Internet Protocol (VoIP).

In some embodiments the communication system 100 provides for communication among devices in multiple networks without requiring a user to switch between the services offered for the various networks. The communication system 100 supports concurrent and simultaneous use of the WPAN 104 and the WLAN 102. Background activities and operation continue without interruption and are not broken on switching allowing continuous network connectivity. The network adapter 120 allows maintenance of Internet and network activity while operating in the WPAN 104, and enables listening to in-coming calls without disconnecting on use of the WPAN 104. In other words, some embodiments support continuous WPAN 104 connectivity.

The wireless network adapter 120 may be part of a Network Interface Card (NIC) which operates simultaneously as an STA and an AP. In some embodiments the network adapter 120 operates to support functions of a Basic Service Set (BSS). The wireless network adapter 120 provides dynamic bandwidth allocation between the WLAN 102 and WPAN 104, and enables power saving in both modes of operation. The various devices within the WLAN 102 view the wireless network adapter 120 as a STA, and devices within the WPAN 104 view the wireless network adapter 120 as an AP. By communicating on a same channel, the WLAN and WPAN operations are allocated to time slots of the communication channel. The sharing of bandwidth provides efficiencies in communication, requiring some coordination to identify when the wireless network adapter 120 is available for the different operating modes.

In some embodiments, receiver 100 may be configured to receive OFDM communication signals over a multicarrier communication channel. The OFDM signals may comprise a plurality of orthogonal subcarriers. In some of these multicarrier embodiments, receiver 100 may be part of a wireless local area network (WLAN) communication station such as a wireless access point (AP), base station or a mobile device including a Wireless Fidelity (WiFi) device. In some broadband multicarrier embodiments, base stations 202 may be part of a broadband wireless access (BWA) network communication station, such as a Worldwide Interoperability for Microwave Access (WiMAX) communication station. In some other broadband multicarrier embodiments, base stations 202 may be a 3rd Generation Partnership Project (3GPP) Universal Terrestrial Radio Access Network (UTRAN) Long-Term-Evolution (LTE) or a Long-Term-Evolution (LTE) communication station, although the scope of the invention is not limited in this respect. In these broadband multicarrier embodiments, base stations 202 and mobile stations 204 may be configured to communicate in accordance with an orthogonal frequency division multiple access (OFDMA) technique.

In some embodiments, receiver 100 may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the invention is not limited in this respect as they may also be suitable to transmit and/or receive communications in accordance with other techniques and standards. In some embodiments, receiver 100 may be configured to receive signals in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. In some embodiments, receiver 100 may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

In some other embodiments, receiver 100 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, receiver 100 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Antennas 101 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some MIMO embodiments, antennas 101 may be effectively separated to take advantage of spatial diversity and the different channel characteristics that may result between each of antennas 101 and the antennas of a transmitting station. In some MIMO embodiments, antennas 101 may be separated by up to ¹⁄₁₀ of a wavelength or more.

Figure 2:
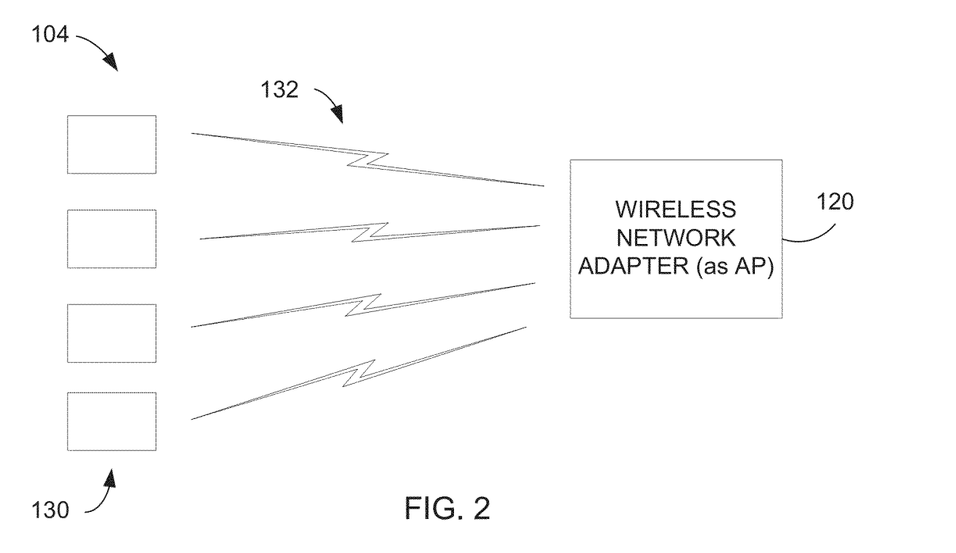
FIG. 2 illustrates a Wireless Local Area Network (WLAN) including a device having a wireless network adapter operating as an Access Point (AP) for the WLAN, in accordance with example embodiments.

FIG. 2 illustrates communications within a WLAN 102 when the wireless network adapter 120 within the computing device 122 acts as an AP and communicates via the communication paths 132. In this way, communications among the various devices 130 are each directed to the wireless network adapter 120 which relays the communication from a source to a destination.

Figure 3:
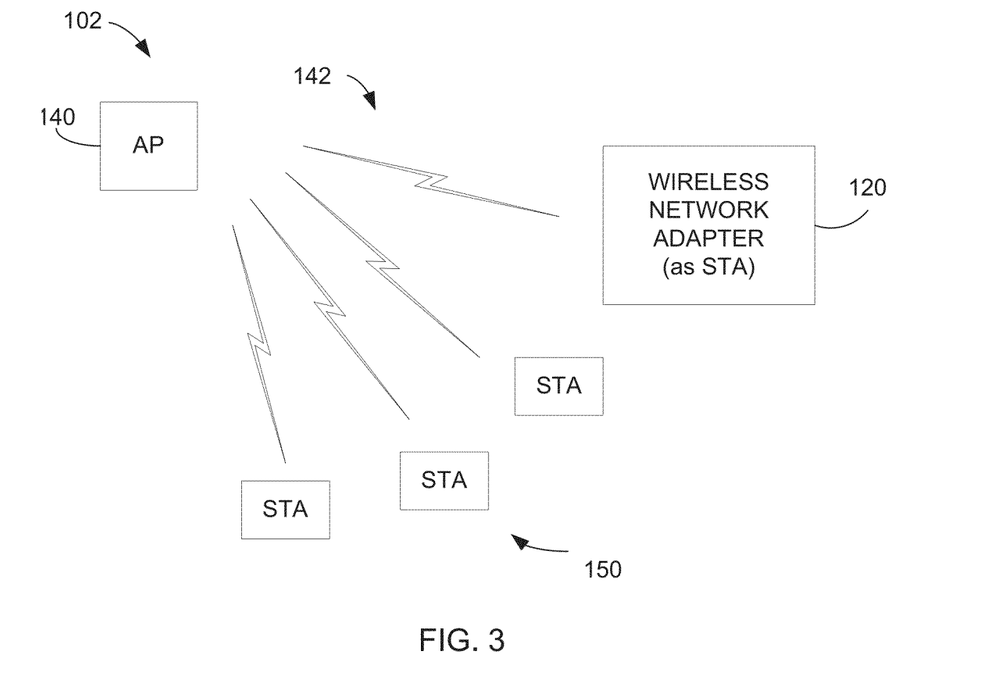
FIG. 3 illustrates a Wireless Personal Area Network (WPAN) including a device having a wireless network adapter operating as a mobile station (STA) in the WPAN, in accordance with example embodiments.

FIG. 3 illustrates communications within a WLAN 102 when the wireless network adapter 120 within the computing device 122 acts as a STA and communicates via a communication path 142 with an AP 140. The WLAN 102 includes other STAs 150, which also may communicate with each other via communication paths 142 and through an AP 140.

Figure 4:
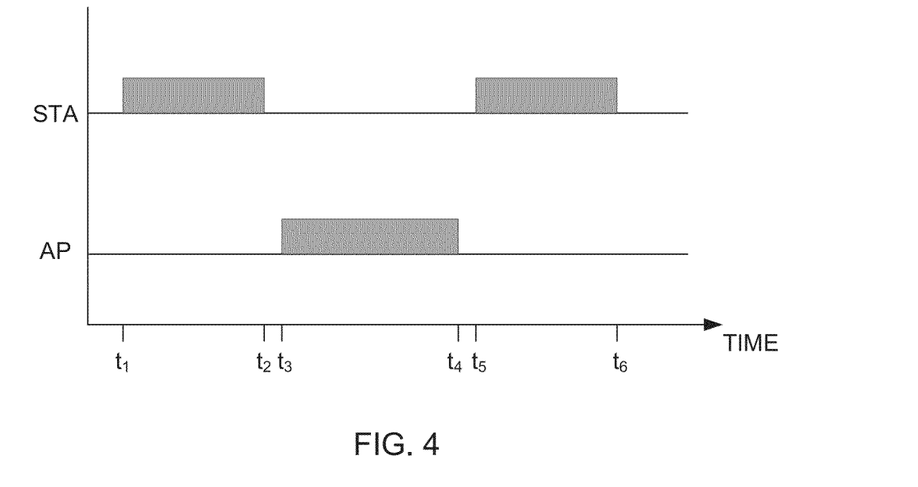
FIG. 4 illustrates, in timing diagram form, operation of a device having a wireless network adapter operating as an AP in a WLAN and as a STA in a WPAN, in accordance with example embodiments.

While the wireless network adapter 120 of communication device 120 operates as an AP in the WPAN 104 it may not be available to operate as an STA in the WLAN 102. In an example embodiment, the wireless network adapter 120 operates as AP and STA simultaneously, wherein the AP and the STA operate during different time slots, such as in a Time Division Multiplex (TDM) manner. The wireless network adapter 120 operates during a first time portion as an STA and during a second time portion as an AP. The time portions may be different lengths to accommodate the operational requirements of the computing device 122 in each network. FIG. 4 illustrates the timing of such operation, wherein from time $t_1$ to time $t_2$ the wireless network adapter 120 operates as a STA, and from time $t_3$ to the time $t_4$ the wireless network adapter 120 operates as an AP. When the WLAN operation is idle, the wireless network adapter 120 operates as a STA from time $t_5$ to the time $t_6$.

As illustrated in FIG. 2, when the wireless network adapter 120 operates as an AP, multiple devices 130 in WPAN 104 connect with each other through the AP, or wireless network adapter 120. And as illustrated in FIG. 3, when the wireless network adapter operates as an STA, the wireless network adapter 120 connects with a WLAN AP 140 to communicate with other devices 150 in WLAN 102, this network may be a conventional WLAN network. In these scenarios, the WLAN 102 and the WPAN 104 may be allocated to a same communication channel, wherein the performance of each network impacts the other network. In some examples the communication paths 132 and communication paths 142 utilize a same over-the-air resource, and therefore traffic conditions for the WLAN may impact the bandwidth of the WPAN. To avoid this impact, some embodiments utilize separate channels for WLAN and WPAN operation. In other words, the WLAN and WPAN transmit on different channels. As different channels are used during each operating time, the AP in the WPAN 104 is not available when the wireless network adapter 120 operates as the STA in the WLAN. During the time slot, such as $t_1$ to $t_2$, for operation as an STA, and operates on a first communication channel. When the wireless network adapter 120 operates as the AP in the WPAN, such as during time $t_3$ to $t_4$, the AP communicates on a second communication channel. During the time slot $t_1$ to $t_2$, any communications received from within the WPAN on the second communication channel may be missed, as the wireless network adapter 120 is operating on the first communication channel. Therefore, a mechanism is used to alert devices 150 of the WPAN 104 as to the time slot during which the wireless network adapter 120 may be unavailable or absent with respect to communications within WPAN 104. In some embodiments, the alert indicates to the devices 120 when and how long the AP will not be available to receive communications.

Figure 5:
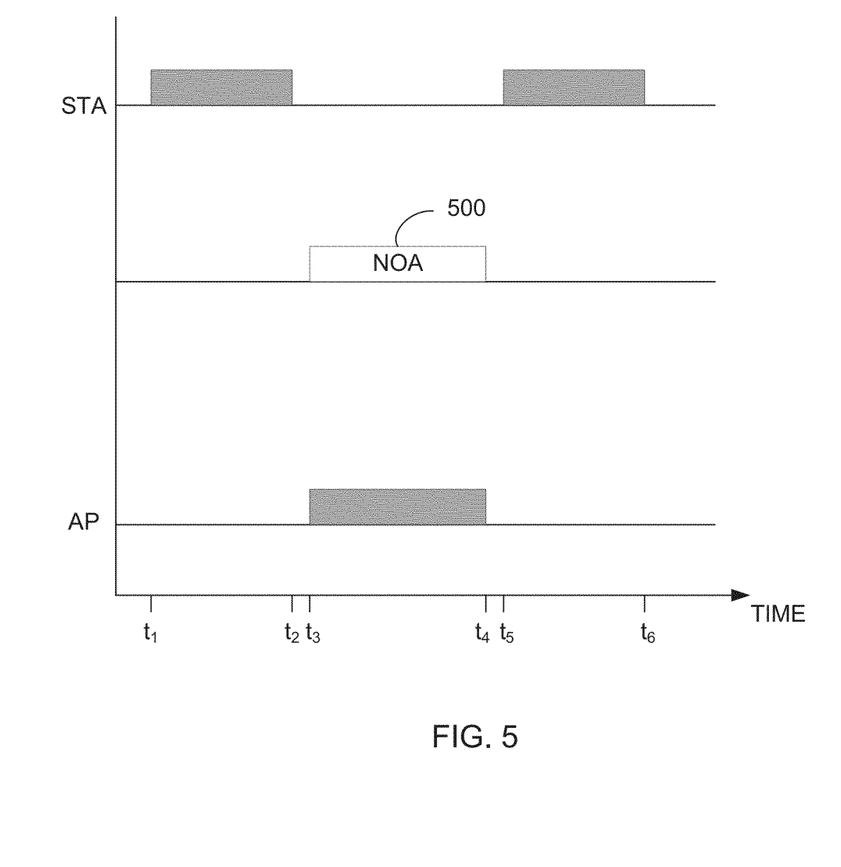
FIG. 5 illustrates, in timing diagram form, operation of a device having a wireless network adapter operating as an AP in a WLAN and as a STA in a WPAN, and including a Notice Of Absence (NOA), in accordance with example embodiments.
Figure 6A:
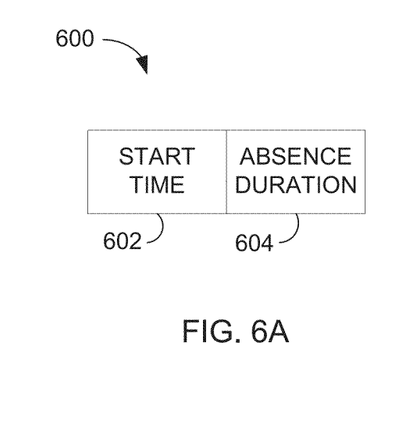
FIGS. 6A, 6B, 6C and 6D illustrate formats for NOA messages, in accordance with example embodiments.

In an example embodiment the alert is provided as a Notice Of Absence (NOA) according to a NOA protocol. The NOA is provided as an indicator to the devices 150, or STAs, in the WPAN 104 and provides information as to a start time of the absence and length of time for the absence. During the absence, the AP of the WPAN 104 will not be available to receive or send communications in the WPAN 104. In response to the NOA, the individual devices 150 will disable transmission for the absence time, and enable transmission upon expiration of the absence time. Some embodiments implement an NOA protocol in at least one driver and/or within the firmware of the wireless network adapter 120. As illustrated in FIG. 5, the NOA is provided concurrently with the time slot during which the WLAN is operational. The NOA 500 is transmitted as an Information Element (IE) from time $t_3$ to time $t_4$. An example of the NOA 500 is illustrated in FIG. 6A as NOA 600 including a first portion or field 602 for a start time of the absence and a second portion or field 604 for an absence duration. In this way, the NOA 600 identifies the duration and start time of each absence, indicating when and how long the AP is not available in the WPAN 104.

Within the wireless network adapter 120, an AP driver, creates the NOA as an IE and adds the NOA IE into a beacon frame for transmission. The wireless network adapter 120 transmits the NOA with the beacon frame to the WPAN. Each of the devices 150, operating as an STA, includes an STA driver whereupon receipt of the transmitted beacon frame from the wireless network adapter 120, the device 150 parses the NOA IE and sends retrieved information to firmware within the device 150 to control transmissions. The information sent to the firmware may be in the form of a command identifying the duration from a start time for the AP absence. The firmware is to disable transmissions during the absence and to enable transmissions after the absence ends.

Figure 6B:
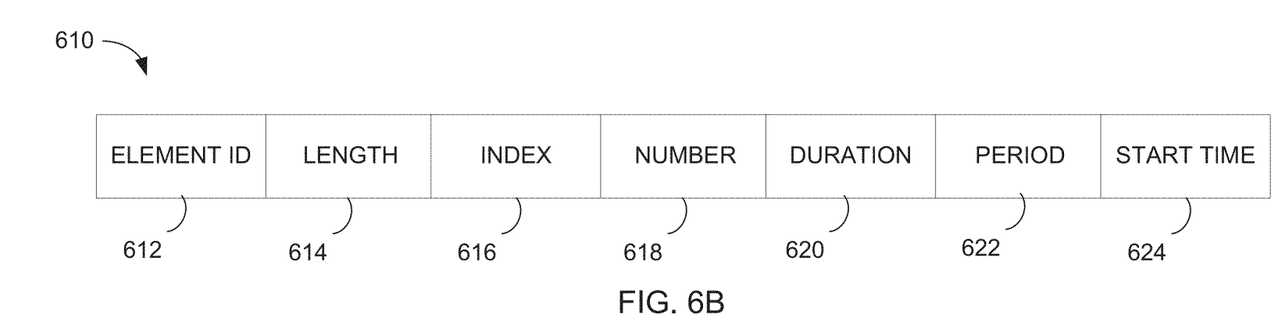

FIG. 6B illustrates a NOA 610 according to an example embodiment, including an element ID 612, a length 614, an index 616, a number 618, duration 620, period 622 and a start time 624. The element ID 612 is the NOA element identified. The index 616 is a field to identify the instance of the NOA 610. The number 618 is the number of absences. The duration 620 identifies the length in time of the absence. The period 622 indicates the interval between two successive periods of absence, and may be expressed in specified units, for example, 32 microsecond units. The start time 624 indicates when the absence will begin, wherein timing is relative to the start time 624. The NOA 610 may be provided in a specific IE of the beacon or in the probe response.

Figure 6C:
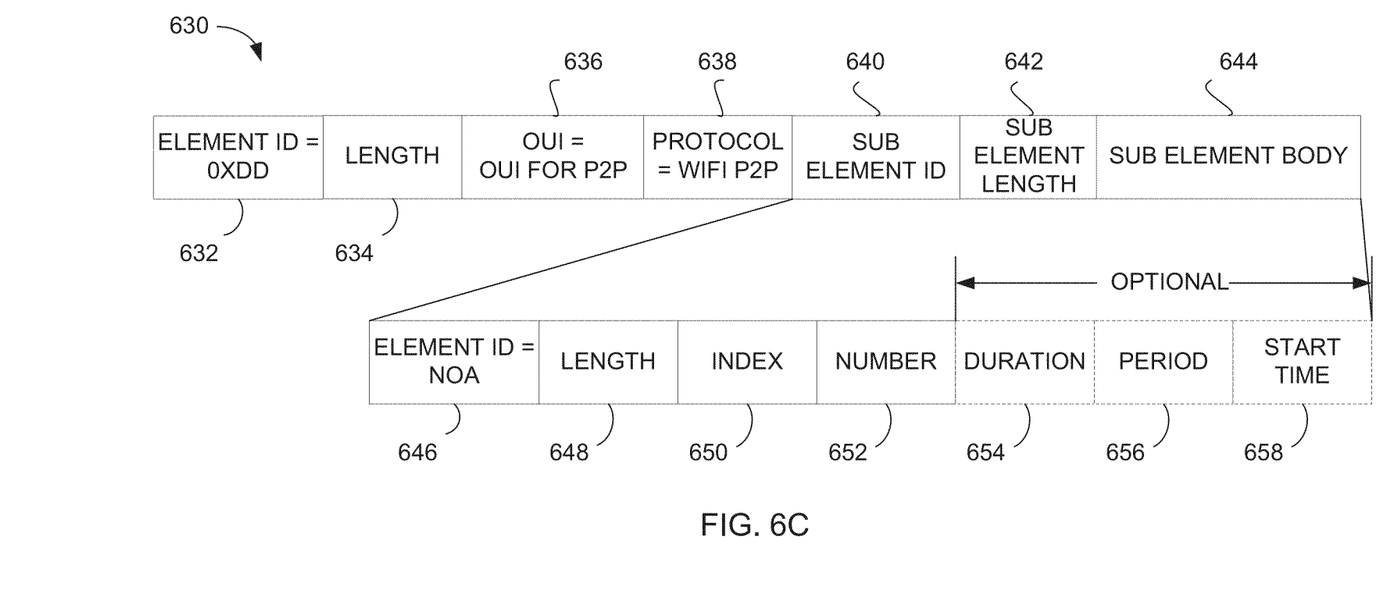

FIG. 6C illustrates a NOA IE 630 according to an example embodiment. The NOA IE 630 includes an element ID 632, a length 632, an OUI 636, a protocol field 638, a sub element ID 640, a sub element length 642, and a sub element body 644. The NOA IE 630 may be a vendor specific IE used to create a sub-element space for new point to point IEs, wherein the NOA IE may include multiple IEs. The sub-element defines the NOA, such as where the sub-element ID 640, the sub-element length 642 and the sub-element body 644 are defined by the set of fields for element ID 646, length 648, index 650, number 652, duration 654, period 656 and start time 658, as defined in FIG. 6B. The duration 654, period 656 and start time 658 may be optionally included.

Figure 6D:
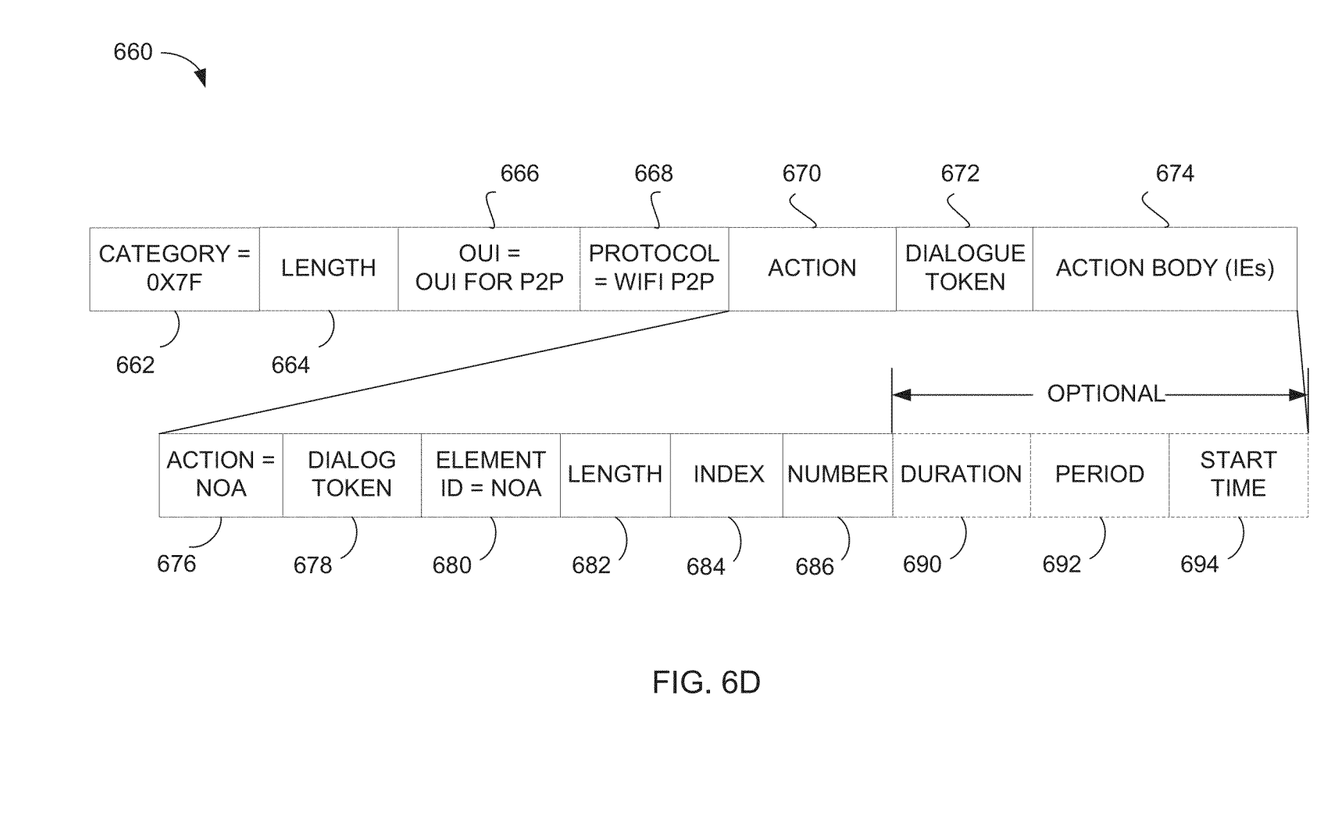

FIG. 6D illustrates an NOA action frame 660 having a category 662, length 664, OUI 666, protocol 668, action 670, dialogue token 672, and action body for the IE 674. The action 670, dialogue token 672, and action body 674 are used to define the NOA, and represent action 676, dialogue token 678, element ID 680, index 684, number 686, duration 690, period 692 and start time 694. In some embodiments the duration 690, period 692 and start time 694 are optionally provided.

Figure 7:
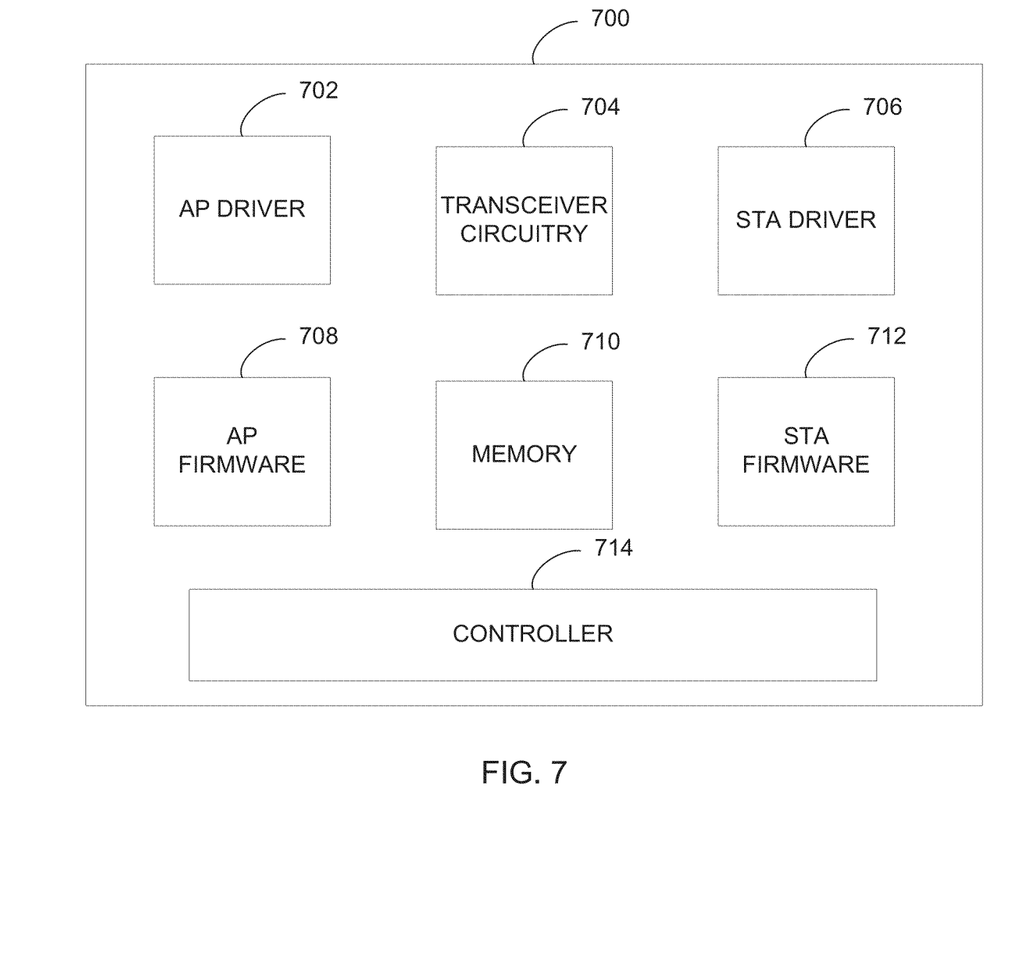
FIG. 7 illustrates a device having a wireless network adapter, in accordance with example embodiments.

A network adapter 120 may be included within a computing device, or may add functionality when communicatively coupled to a computing device. FIG. 7 illustrates a computing device 700 including a network adapter, having a controller 714 to control operations within the computing device 700 and operation of the AP driver 702 and AP firmware 708 while operating as a WPAN module. The AP driver 702 implements protocols and procedures associated with operating as an AP, including provision and timing of signaling and other messages. When operating as an AP, the computing device 700 relays and routes calls to and from various devices within the WPAN. The controller 714 further controls storing of data, information and control in memory 710 as well as retrieval therefrom. The computing device 700 further includes transceiver circuitry 704 to facilitate communications in a WPAN and communications in a WLAN. The AP firmware 708 includes code, instructions and control information for operation as an AP. The controller 714 also controls operation of the computing device 700 when operating in the WLAN as a STA by controlling STA driver 706 and STA firmware 712. The computing device 700 communicates with an external AP within the WLAN through which the computing device 700 sends messages and responds to messages. The STA firmware 712 includes code, instructions and control information for operation as an STA.

Figure 8:
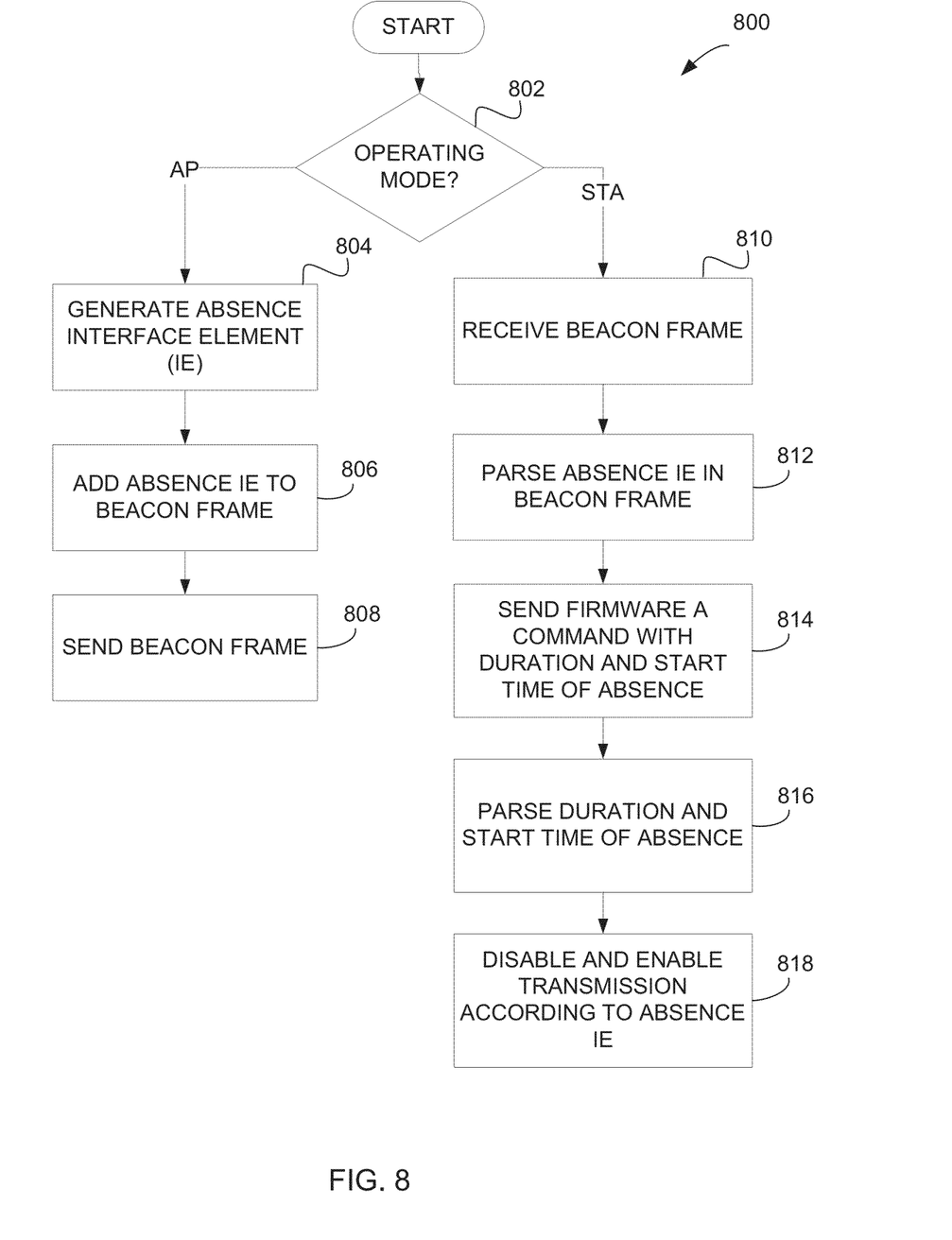
FIG. 8 illustrates a method, in flow diagram form, to determine and use a NOA message in accordance with example embodiments.

In operation, the devices within the WPAN 104 include functionality to receive a NOA and control the transmissions to the wireless network adapter 120. The operations are detailed in the process flow of method 800 in FIG. 8. For operation of the wireless network adapter 120 as an AP in the WPAN 104 operation of the AP includes activities to generate an absence IE at operation 804, adding the absence IE to a beacon frame at operation 806, and sending the beacon frame at operation 808. For operation of the wireless network adapter 120 as an STA in a WLAN 102, operation of a device within the WLAN 102 includes activities to receive the beacon frame at operation 810, wherein the beacon frame is received from the AP. The device then parses the absence IE included in the beacon frame at operation 812, and sends the information to firmware of the device. The information includes a command identifying the absence start time and duration at operation 814. The device parses the duration and start time of the absence at operation 816 and then disables and enables transmissions according to the absence IE. Specifically, the absence IE or NOA IE provides information to identify a time when transmissions may be sent to the AP.

Figure 9:
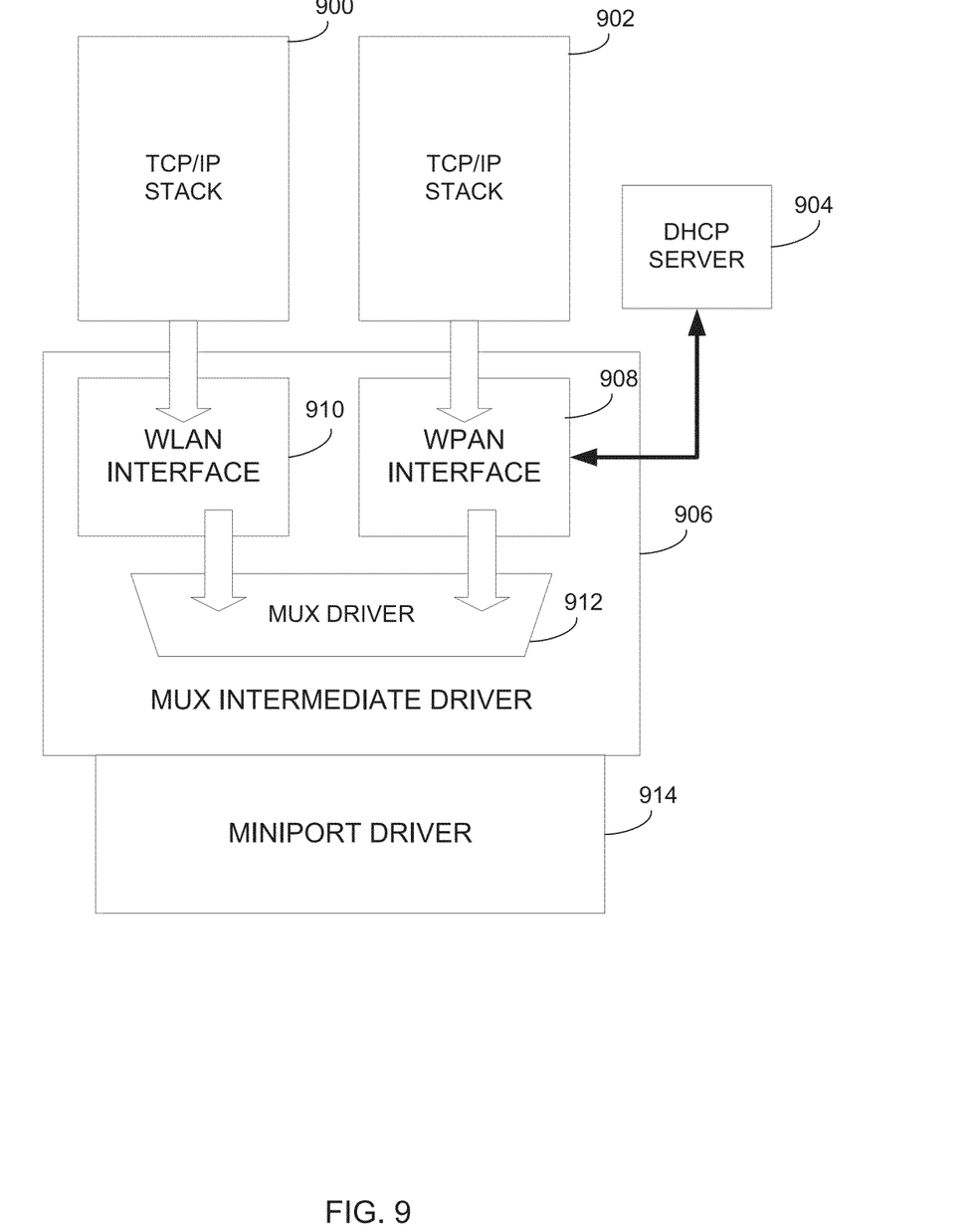
FIG. 9 illustrates operation of the wireless network adapter, in accordance with example embodiments.

FIG. 9 illustrates operation of some embodiments of the wireless network adapter 120, wherein the WLAN interface 910 and the WPAN interface 908 both receive information from Transfer Control Protocol (TCP)/Internet Protocol (IP) stacks 900 and 902. Further, the WPAN interface 908 communicates with a configuration server, such as the Dynamic Host Configuration Protocol (DHCP) server 904. The WLAN interface 910 is tasked with controlling operation of the wireless network adapter 120 as a STA in the WLAN 102. The WPAN interface 908 is tasked with controlling operation of the wireless network adapter 120 as an AP in the WPAN 104. The WLAN interface 910 and the WPAN interface 908 are coupled to the MUX driver 912 for communication with a miniport driver 914. The WLAN interface 910, the WPAN interface 908, and the MUX driver 912 are part of a MUX intermediate driver 906.

In some embodiments, a machine-readable medium is comprised of instructions, which when implemented by one or more machines, cause the one or more machines to receive a registration request from a service provider, store a set of information for the service provider in a memory storage unit, and transmit an indication of the service provider to at least one service consumer in the wireless communication network.

Unless specifically stated otherwise, terms such as "processing," "computing," "calculating," "determining," "displaying," or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments may be implemented in one or a combination of hardware, firmware, and software. Embodiments may also be implemented as instructions stored on a machine-readable medium, which may be read and executed by at least one processor to perform the operations described herein. A machine-readable medium may include any mechanism for storing or transmitting information in a form readable by a machine (e.g., a computer). A machine-readable medium may include, but is not limited to, FLASH memory, optical disks, Compact Disks-Read Only Memory (CD-ROM), Digital Versatile/Video Disks (DVD), Read Only Memory (ROM), Random Access Memory (RAM), EPROM, Electrically Erasable Programmable Read-Only Memory (EEPROM), magnetic or optical cards, or other type of machine-readable media suitable for storing electronic instructions. For example, embodiments may be downloaded as a computer program, which may be transferred from a remote computer (e.g., a server) to a requesting computer (e.g., a client) by way of data signals via a communication link (e.g., a modem or network connection).

It should be appreciated that reference throughout this specification to "one embodiment" or "an embodiment" means that a particular feature, structure or characteristic described in connection with at least one embodiment. Therefore, it should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

Similarly, it should be appreciated that in the foregoing description of embodiments, various features are sometimes grouped together in a single embodiment, figure, or description thereof for the purpose of streamlining the disclosure, aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment Having disclosed embodiments and the best mode, modifications and variations may be made to the disclosed embodiments while remaining within the scope of the embodiments as defined by the following claims. The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for managing network communications performed by a wireless network adapter, the method comprising:

generating a Notice of Absence (NOA) message for transmission on a first wireless network, the wireless network adapter operating as an access point (AP) on the first wireless network, the first wireless network being a Wireless Personal Area Network (WPAN), the NOA message providing an identification of a start time, a duration, an instance of the NOA, a number of absences, and a periodicity for a plurality of timeslots during which the wireless network adapter is configured to operate in a second wireless network, the start time specifying a time at which a first of the plurality of timeslots begins, the duration specifying the duration of the plurality of timeslots, and the periodicity specifying a length of time between successive timeslots;

transmitting the NOA message from the wireless network adapter over the first wireless network to indicate to a receiving device in the first wireless network an unavailability of operation of the wireless network adapter with the first wireless network during the plurality of timeslots;

delaying network communications from the wireless network adapter to the receiving device via the first wireless network during the plurality of timeslots, wherein the receiving device in response to the NOA message delays network communications to the wireless network adapter via the first wireless network during the plurality of timeslots; and operating as a station (STA) in the second wireless network during the plurality of timeslots the second wireless network being a Wireless Local Area Network (WLAN).

2. The method of claim 1, wherein the WPAN and the WLAN operate on at least a portion of a same frequency spectrum.

3. The method of claim 1, wherein the NOA message is included in a NOA Information Element (IE) in a beacon frame.

4. The method of claim 1, wherein the second wireless network is a network operating according to an 802.11 family of standards.

5. The method of claim 1, comprising:
operating the wireless network adapter in the second wireless network during the plurality of time slots; and
operating the wireless network adapter in the first wireless network between the plurality of time slots.

6. A wireless network device, comprising:
controller circuitry configured to implement instructions to generate a Notice of Absence (NOA) message for transmission on a first wireless network, the wireless network device operating as an access point (AP) on the first wireless network, the first wireless network a Wireless Personal Area Network (WPAN), the NOA message providing an identification of a start time, a duration, an instance of the NOA, a number of absences, and a periodicity for a plurality of timeslots during which the wireless network device is configured to operate in a second wireless network, the start time specifying a time at which a first of the plurality of timeslots begins, the duration specifying the duration of the plurality of timeslots and the periodicity specifying a length of time between successive timeslots; and
transceiver circuitry configured to transmit the NOA message from the wireless network device over the first wireless network to indicate to a receiving device in the first wireless network an unavailability of operation of the wireless network device with the first wireless network during the plurality of timeslots;
wherein the controller circuitry is further configured to implement instructions to delay network communications from the wireless network device to the receiving device via the first wireless network during the plurality of timeslots, wherein the receiving device in response to the NOA message delays network communications to the wireless network device via the first wireless network during the plurality of timeslots; and
the controller circuitry to implement instructions for operating as a station (STA) in the second wireless network during the plurality of timeslots, the second wireless network a Wireless Local Area Network (WLAN).

7. The wireless network device of claim 6, wherein the wireless network device is part of a wireless network adapter.

8. The wireless network device of claim 6, wherein the WPAN and the WLAN operate on a same channel.

9. The wireless network device of claim 6, wherein the second wireless network is a network operating according to an 802.11 family of standards.

10. The wireless network device of claim 6, wherein the controller circuitry implements instructions for:
operating the wireless network device in the second wireless network during the plurality of time slots; and
operating the wireless network device in the first wireless network between the plurality of time slots.

11. At least one non transitory machine-readable medium that stores instructions, which when executed by one or more processors of a wireless network adapter, configures the wireless network adapter to:
generate a Notice of Absence (NOA) message for transmission on a first wireless network, the wireless network adapter operating as an access point (AP) on the first wireless network, the first wireless network a Wireless Personal Area Network (WPAN), the NOA message providing an identification of a start time, a duration, an instance of the NOA, a number of absences, and a periodicity for a plurality of timeslots during which the wireless network adapter is configured to operate in a second wireless network, the start time specifying a time at which a first of the plurality of timeslots begins, the duration specifying the duration of the plurality of timeslots and the periodicity specifying a length of time between timeslots;
transmit the NOA message from the wireless network adapter over the first wireless network to indicate to a receiving device in the first wireless network an unavailability of operation of the wireless network adapter with the first wireless network during the plurality of timeslots; and
delay network communications from the wireless network adapter to the receiving device via the first wireless network during the plurality of timeslots, wherein the receiving device in response to the NOA message delays network communications to the wireless network adapter via the first wireless network during the plurality of timeslots; and
operating as a station (STA) in the second wireless network during the plurality of timeslots, the second wireless network a Wireless Local Area Network (WLAN).

12. The machine readable medium of claim 11, wherein the WPAN and the WLAN operate on a same channel.

13. The machine readable medium of claim 11, wherein the NOA message is included in a NOA Information Element IF in a beacon frame.

14. The machine readable medium of claim 11, wherein the second wireless network is a network operating according to an 802.11 family of standards.

15. The machine readable medium of claim 11, wherein the operations further configure the wireless network adapter to:
operate the wireless network adapter in the second wireless network during the plurality of time slots; and
operate the wireless network adapter in the first wireless network between the plurality of time slots.

* * * * *